United States Patent
Saito et al.

(10) Patent No.: US 7,108,903 B2
(45) Date of Patent: Sep. 19, 2006

(54) MAGNETIC DISC MEDIUM

(75) Inventors: Shinji Saito, Kanagawa (JP); Hitoshi Noguchi, Kanagawa (JP); Hideaki Shiga, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/704,717

(22) Filed: Nov. 12, 2003

(65) Prior Publication Data

US 2004/0096702 A1  May 20, 2004

(30) Foreign Application Priority Data

Nov. 14, 2002  (JP) ................................ P.2002-330989

(51) Int. Cl.
*G11B 5/82* (2006.01)
*B65D 85/30* (2006.01)

(52) U.S. Cl. ................. 428/65.3; 428/694 BH; 360/133; 206/308.3

(58) Field of Classification Search ................ 428/65.3, 428/694 BH; 360/133; 206/308.3
See application file for complete search history.

(56) References Cited

U.S. PATENT DOCUMENTS 5,164,239 A * 11/1992 Ozawa et al. .............. 428/65.6
5,179,487 A * 1/1993 Niitsuma et al. ........... 360/133
5,455,109 A * 10/1995 Atkinson et al. ........... 428/171

FOREIGN PATENT DOCUMENTS

JP   5-20832 A    1/1993
JP   5-109061 A   4/1993

* cited by examiner

*Primary Examiner*—Stevan A. Resan
(74) *Attorney, Agent, or Firm*—Sughrue Mion, PLLC

(57) ABSTRACT

A magnetic disc medium comprising: a magnetic sheet in the form of a disk; a case encasing the magnetic sheet so as to be capable of rotating; and a nonwoven liner fastened on an inner face of the case so as to face the magnetic sheet, wherein the magnetic sheet comprises a support, a substantially nonmagnetic lower layer, and a magnetic layer containing hexagonal ferrite powder dispersed in a binder and having central plane average surface roughness of from 1 nm to 4 nm, and the liner comprises polyethylene terephthalate in an amount of 20% by weight or more.

14 Claims, No Drawings

MAGNETIC DISC MEDIUM

FIELD OF THE INVENTION

The present invention relates to a magnetic disc medium capable of high density recording.

BACKGROUND OF THE INVENTION

In the field of the magnetic disc, a 2 MB MF-2HD floppy disc using Co-modified iron oxide has been generally loaded in a personal computer. However, along with the rapid increase in the amount of data to be dealt with, the capacity of the disc has become insufficient and the increase in the capacity of the floppy disc has been demanded.

Magnetic recording media comprising a magnetic layer containing an iron oxide, a Co-modified iron oxide, $CrO_2$, ferromagnetic metal powder, or hexagonal ferrite powder dispersed in a binder coated on a nonmagnetic support have been conventionally widely used. Ferromagnetic hexagonal ferrite fine powders have been known to have excellent high density recording characteristics among these.

On the other hand, a disc-like magnetic recording medium (magnetic recording medium in the form of a disk) comprising a thin magnetic layer and a functional nonmagnetic layer has been developed and floppy discs of the class with the capacity of 100 MB are now on the market. As floppy discs showing these characteristics, the constitution comprising a magnetic layer having Hc of 1,400 Oe or more and a thickness of 0.5 µm or less and a nonmagnetic layer containing electrically conductive particles is proposed in JP-A-5-109061 (the term "JP-A" as used herein means an "unexamined published Japanese patent application").

However, with the rapid trend of the increase in the capacity and density of magnetic disc media, it has become difficult to obtain satisfactory characteristics even with these techniques. In particular, when high recording density is actualized, the smoothest possible surface is necessary for obtaining high electromagnetic characteristics.

A magnetic disc medium is generally designed so that the surface of the magnetic sheet is maintained clean by means of a liner (see JP-A-5-20832).

When hexagonal ferrite powder is used in a magnetic disc medium, however, a recording layer is scraped off due to the liner, and the resulting minute recording layer defects and the minute dusts of the liner flocks cause dropout, which suddenly increases an error rate. Patent literature 2 aims at preventing the mold growing in a magnetic disc medium and the above problem is not disclosed.

Accordingly, it has been desired to develop a liner material suitable for a magnetic layer containing a hexagonal ferrite powder and excellent in surface smoothness, which can ensure the surface property and the surface cleanliness of the magnetic layer and can get rid of the scraping of the liner, to thereby provide a magnetic disc medium free of dropout.

SUMMARY OF THE INVENTION

An object of the present invention is to provide a magnetic disc medium which shows excellent recording characteristics in high density recording, hardly generates dropout and ensures highly reliable durability.

As a result of earnest investigation to achieve the above object, the present inventors have found that a magnetic disc medium which shows excellent recording characteristics in high density recording, hardly generates dropout and ensures highly reliable durability can be obtained by a magnetic disc medium comprising a disc-like magnetic sheet (magnetic sheet in the form of a disk), a case encasing the magnetic sheet so as to be capable of rotation, and a nonwoven liner fastened on the inside of the case with facing the magnetic sheet, wherein the magnetic sheet comprises a support having provided thereon a substantially nonmagnetic lower layer, and a magnetic layer containing hexagonal ferrite powder dispersed in a binder and having central plane average surface roughness of from 1 nm to 4 nm, and the liner contains polyethylene terephthalate in an amount of 20 mass % (% by weight) or more.

The reason why the magnetic disc medium according to the present invention exhibits excellent characteristics in high density recording is not clearly known but it is conceived as follows.

Since conventional magnetic discs having magnetic layers containing alloy magnetic substances and iron oxide magnetic substances are soft in the surfaces, the surfaces of the magnetic layers are scraped off and sufficient durability cannot be obtained when a PET liner is used, as a result, dropout increases. Therefore, liners containing softer rayon and nylon as main components are suited.

It is thought, on the other hand, since magnetic layers containing hexagonal ferrite powder are hard in the surfaces, liners are scraped off and the liner flocks cause dropout when liners containing softer rayon and nylon as main components are used, or the flocks of liners get into the gap between the magnetic head and the magnetic layer and scratch the magnetic layer, to thereby deteriorate durability. It is presumed that when a liner containing hexagonal ferrite powder and 20 mass % or more of polyethylene terephthalate is used, a magnetic layer is not scraped off by the liner and vice versa, therefore dropout less increases and durability can be ensured.

In the present invention, the restrictions of liner composition and the central plane average surface roughness (Ra) of a magnetic layer surface to a prescribed range contribute to the inhibitions of output reduction due to space loss, generation of liner flocks, scraping off of a magnetic layer by means of a liner.

DETAILED DESCRIPTION OF THE INVENTION

Cartridge and Liner:

Nonwoven liners for use in the present invention may comprise polyethylene terephthalate (hereinafter referred to as "PET") alone or other components may be mixed besides PET, but it is necessary for the liners of the present invention to contain at least 20 mass % of PET, preferably 50 mass % or more. The examples of the components other than PET include nylon, rayon, cellulose, polypropylene and acrylic fibers. The thickness, length and physical strengths (e.g., tensile strength, elongation, modulus of elasticity, hardness (Tg) and the like) of these fibers or fiber bundles are arbitrarily selected.

The liners of the present invention may be multilayer structure comprising two or more layers, but at least the layer on the side contiguous to a magnetic sheet has to satisfy the conditions of the present invention.

The surfaces of the liners of the invention on the side contiguous to a magnetic sheet are preferably in a nap-raising state for the improvement of dust removal. As nap-raising treatment, e.g., a method of raising the edges of long fibers on the surface by rubbing the surface by means of something like a brush can be used.

The liners are fastened on the upper and lower shells constituting a cartridge by ultrasonic welding and adhesion. The liners may be fastened entirely, or may be fastened partially so as to make free edges.

For raising a dust removing property with maintaining low torque, the convexities protruding toward the magnetic sheet sides may be formed on the upper and lower shells on which the liners are fastened so that the liners are easily partially brought into contact with a magnetic sheet.

When the peripheral edge of a liner is not fastened on the inner surface of the case, the fibers of the liner material begin to fray from the outermost edge, which sometimes cause dropout. The thus-released fibers from the liner also adhere to a magnetic sheet and cause dropout. For preventing such a problem from occurring, in the magnetic disc cartridge of the present invention, it is preferred to subject the peripheral edge of the liner to fixing treatment such as adhesion by heat welding or with an adhesive so that fraying does not occur.

It is also possible to raise the contact effect of a dust-removing liner with a magnetic sheet by forming the convexities protruding toward the magnetic sheet sides on the dust-removing liner. The cleaning effect of the magnetic sheet by means of the liner is improved by using the liner provided with such convexities.

The thickness of the liners of the invention is not particularly restricted but is preferably from 20 μm to 1 mm, and more preferably from 100 μm to 500 μm.

The liners of the present invention may be subjected to antifungal treatment. The metallic copper as disclosed in JP-A-5-20832 may be applied to the liners of the present invention.

Hexagonal Ferrite Powder:

The examples of hexagonal ferrite powders which are contained in the uppermost layer of the present invention include barium ferrite, strontium ferrite, lead ferrite, calcium ferrite, and the substitution products of these ferrites, e.g., the Co substitution products. Specifically, magnetoplumbite type barium ferrite and strontium ferrite, magnetoplumbite type ferrite having covered the particle surfaces with spinel, and magnetoplumbite type barium ferrite and strontium ferrite partially containing spinel phase are exemplified. The hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W. Re, Au, Hg, Pb, Bi, La, Ce, Pr, Nd, P, Co, Mn, Zn, Ni, Sr, B, Ge and Nb. In general, hexagonal ferrite powders containing the following elements can be used, e.g., Co—Zn, Co—Ti, Co—Ti—Zr, Co—Ti—Zn, Ni—Ti—Zn, Nb—Zn—Co, Sb—Zn—Co and Nb—Zn. According to starting materials and manufacturing processes, specific impurities may be contained.

Hexagonal ferrite powders preferably have an average tabular diameter of from 12 to 50 nm, an average tabular thickness of from 5 to 15 nm, and a coercive force of from 1,800 Oe (144 kA/m) to 5,000 Oe (400 kA/m), more preferably from 2,000 Oe (160 kA/m) to 3,500 Oe (280 kA/m).

When the average tabular diameter is less than 10 nm or the average tabular thickness is 5 nm or less, it is difficult to maintain magnetic anisotropy, so that the coercive force lowers and the thermal stability is disadvantageously deteriorated.

When the coercive force is less than 1,800 Oe (144 kA/m), the magnetic layer is susceptible to demagnetization due to recording and the output lowers, while when it exceeds 5,000 Oe (400 kA/m), recording by means of a magnetic head becomes difficult and the output lowers.

The tabular ratio (tabular diameter/tabular thickness) of hexagonal ferrite powders is preferably from 2 to 5. When the tabular ratio is small, the packing density in a magnetic layer becomes high and preferred but satisfactory orientation cannot be obtained. When the tabular ratio is great, noise increases due to stacking among particles. The specific surface area ($S_{BET}$) measured by the BET method of the particles having diameters within this range is from 20 to 200 m$^2$/g. The distribution of tabular diameter-tabular thickness is generally preferably as narrow as possible.

The specific surface area distributions can be compared by measuring TEM photographs of 500 particles selected randomly. The distributions are in many cases not regular distributions, but when expressed by the standard deviation to the average size from calculation, a/average size is from 0.1 to 2.0. For obtaining narrow particle size distribution, it is effective to make a particle-forming reaction system as homogeneous as possible, and subject particles formed to distribution-improving treatment as well. For instance, a method of selectively dissolving ultrafine particles in an acid solution is also known.

Hc can be controlled by particle sizes (tabular diameter-tabular thickness), the kinds and amounts of the elements contained, the substitution sites of the elements, and the particle-forming reaction conditions. Saturation magnetization ($\sigma_s$) is from 40 to 80 A·m$^2$/kg. $\sigma_s$ is preferably higher but it has inclination of becoming smaller as particles become finer. For the purpose of improving $\sigma_s$, it is well known to make composite of magnetoplumbite ferrite with spinel ferrite, and to select kinds and amounts of elements to be contained. It is also possible to use W type hexagonal ferrite. When magnetic powders are dispersed, the particle surfaces of the magnetic powders may also be treated with substances compatible with the dispersion media and the polymers. Inorganic and organic compounds are used as the surface treating agents. For instance, oxides or hydroxides of Si, Al and P, various kinds of silane coupling agents, and various kinds of titanium coupling agents are representative examples of the surface treating agents. The amount of these surface treating agents is from 0.1 to 10% based on the amount of the magnetic substance. The adsorption of a lubricant, e.g., fatty acid, becomes 100 mg/m$^2$ or less by performing surface treatment, which is, therefore, preferred. The pH of magnetic substances is also important for dispersion, and the pH is generally from 4 to 12 or so. The optimal value is dependent upon the dispersion medium and the polymer. pH of from 6 to 11 or so is selected taking the chemical stability and the storage stability of the medium into consideration. The water content in magnetic substance also affects dispersion. The optimal value is dependent upon the dispersion medium and the polymer, and the water content of from 0.01 to 2.0% is generally selected. The producing methods of hexagonal ferrites include the following methods and any of these methods can be used in the present invention with no restriction: (1) A glass crystallization method in which metal oxides which substitute barium oxide, iron oxide and iron, and boron oxide and the like as a glass forming material are mixed so as to make a desired ferrite composition, melted, and then suddenly cooled to obtain an amorphous product, the obtained product is reheating-treated, washed and then pulverized to obtain barium ferrite crystal powder; (2) A hydrothermal reaction method in which a solution of metal salt of barium ferrite composition is neutralized with an alkali, byproducts are removed, followed by liquid phase heating at 100° C. or more, washing, drying and then pulverization to obtain barium ferrite crystal powder; and (3) A coprecipitation method in which a solution of metal salt of barium ferrite composition is neutralized with an alkali, byproducts are removed, followed by drying, treatment at 1,100° C. or less, and then pulverization to obtain barium ferrite crystal powder. Soluble inorganic ions, e.g., Na, Ca, Fe, Ni or Sr are sometimes contained in hexagonal ferrite powders. It is preferred substantially not to contain such soluble inorganic ions, but the properties of hexagonal ferrite powders are not particularly affected if the content is 200 ppm or less.

Lower Layer:

The lower layer in the present invention is described in detail below. The inorganic powders for use in the lower layer are nonmagnetic powders and they can be selected from inorganic compounds, e.g., metallic oxide, metallic carbonate, metallic sulfate, metallic nitride, metallic carbide and metallic sulfide. The examples of the inorganic compounds are selected from the following compounds and they can be used alone or in combination, e.g., alpha-alumina having an alpha-conversion rate of 90% or more, beta-alumina, gamma-alumina, theta-alumina, silicon carbide, chromium oxide, cerium oxide, alpha-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred for the reasons that they have narrow particle size distribution and a variety of means for imparting functions, and titanium dioxide and alpha-iron oxide are more preferred. These nonmagnetic powders preferably have a particle size of from 0.005 to 2 µm. If necessary, a plurality of nonmagnetic powders each having a different particle size may be combined, or single nonmagnetic powder having a broad particle size distribution may be used so as to attain the same effect as such a combination. A particularly preferred particle size of nonmagnetic powders is from 0.01 to 0.2 µm. In particular, when nonmagnetic powders are granular metallic oxides, the average particle size is preferably 0.08 µM or less, and when nonmagnetic powders are acicular metallic oxides, the long axis length is preferably 0.3 µm or less, and more preferably 0.2 µm or less. The nonmagnetic powders for use in the present invention have a tap density of from 0.05 to 2 g/ml, and preferably from 0.2 to 1.5 g/ml; a water content of generally from 0.1 to 5 mass %, preferably from 0.2 to 3 mass %, and more preferably from 0.3 to 1.5 mass %; a pH value of generally from 2 to 11, and particularly preferably from 5.5 and 10; a specific surface area ($S_{BET}$) of generally from 1 to 100 m$^2$/g, preferably from 5 to 80 m$^2$/g, and more preferably from 10 to 70 m$^2$/g; a crystallite size of preferably from 0.004 to 1 µm, and more preferably from 0.04 to 0.1 µm; an oil absorption amount using DBP (dibutyl phthalate) of generally from 5 to 100 ml/100 g, preferably from 10 to 80 ml/100 g, and more preferably from 20 to 60 ml/100 g; and a specific gravity of generally from 1 to 12, and preferably from 3 to 6. The figure of the nonmagnetic powders may be any of acicular, spherical, polyhedral and tabular figures. The nonmagnetic powders preferably have a Mohs' hardness of from 4 to 10. The SA (stearic acid) adsorption amount of the nonmagnetic powders is generally from 1 to 20 µmol/m$^2$, preferably from 2 to 15 µmol/m$^2$, and more preferably from 3 to 8 µmol/m$^2$. The pH value of the nonmagnetic powders is preferably between 3 and 6. The surfaces of these nonmagnetic powders are preferably covered with $Al_2O_3$, $SiO_2$, $TiO_2$, $ZrO_2$, $SnO_2$, $Sb_2O_3$, ZnO or $Y_2O_3$. $Al_2O_3$, $SiO_2$, $TiO_2$ and $ZrO_2$ are preferred in particular in the point of dispersibility, and $Al_2O_3$, $SiO_2$ and $ZrO_2$ are more preferred. These surface-covering agents can be used in combination or may be used alone. A surface-treated layer subjected to coprecipitation treatment may be used according to the purpose, alternatively, surface treatment of particles may be previously performed to be covered with alumina in the first place, and then the alumina-covered surface may be covered with silica, or vice versa. A surface-covered layer may be porous, if necessary, but a homogeneous and dense surface is generally preferred.

The specific examples of the nonmagnetic powders for use in the lower layer according to the present invention include Nanotite (manufactured by Showa Denko Co., Ltd.), HIT-100 and ZA-G1 (manufactured by Sumitomo Chemical Co., Ltd.), alpha-hematite DPN-250, DPN-250BX, DPN-245, DPN-270BX, DPN-500BX, DBN-SA1 and DBN-SA3 (manufactured by Toda Kogyo Co., Ltd.), titanium oxide TTO-51B, TTO-55A, TTO-55B, TTO-55C, TTO-55S, TTO-55D, SN-100, alpha-hematite E270, E271, E300 and E303 (manufactured by Ishihara Sangyo Kaisha Ltd.), titanium oxide STT-4D, STT-30D, STT-30, STT-65C, and alpha-hematite alpha-40 (manufactured by Titan Kogyo Co., Ltd.), MT-100S, MT-100T, MT-150W, MT-500B, MT-600B, MT-100F and MT-500HD (manufactured by Teika Co., Ltd.), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil Co., Ltd.), and 100A, 500A and calcined products of 100A and 500A (manufactured by Ube Industries, Ltd.). Particularly preferred nonmagnetic powders are titanium dioxide and alpha-iron oxide.

By incorporating carbon blacks into the lower layer, a desired micro Vickers' hardness can be obtained in addition to the well-known effects of reducing surface electrical resistance (Rs) and light transmittance. Further, it is also possible to obtain the effect of stocking a lubricant by the incorporation of carbon blacks into the lower layer. Furnace blacks for rubbers, thermal blacks for rubbers, carbon blacks for coloring and acetylene blacks can be used in the present invention. The carbon blacks used in the lower layer should optimize the following characteristics by the desired effects and sometimes more effects can be obtained by the combined use.

The carbon blacks which are used in the lower layer in the present invention have a specific surface area ($S_{BET}$) of from 100 to 500 m$^2$/g, and preferably from 150 to 400 m$^2$/g, a DBP oil absorption amount of from 20 to 400 ml/100 g, and preferably from 30 to 400 ml/100 g, a particle size of from 5 to 80 nm, preferably from 10 to 50 nm, and more preferably from 10 to 40 nm, a pH value of from 2 to 10, a water content of from 0.1 to 10%, and a tap density of from 0.1 to 1 g/ml. The specific examples of the carbon blacks for use in the present invention include BLACKPEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). The carbon blacks for use in the present invention may be in advance surface-treated with a dispersant, may be grafted with a resin, or a part of the surface may be graphitized before use. The carbon blacks may be previously dispersed in a binder before addition to a coating solution.

These carbon blacks can be used within the range not exceeding 50 mass % based on the above inorganic compounds and not exceeding 40 mass % based on the total weight of the nonmagnetic layer. These carbon blacks can be used alone or in combination. Regarding the carbon blacks which can be used in the present invention, for instance, *Carbon Black Binran* (*Handbook of Carbon Blacks*) (edited by the Carbon Black Association) can be referred to.

Organic powders can be used in the lower layer of the invention according to the purpose. The examples of such organic powders include acrylic styrene resin powders, benzoguanamine resin powders, melamine resin powders, and phthalocyanine pigments. In addition, polyolefin resin powders, polyester resin powders, polyamide resin powders, polyimide resin powders and polyethylene fluoride resin powders can also be used. The producing methods of these powders are disclosed in JP-A-62-18564 and JP-A-60-255827.

The binder resins, lubricants, dispersants, additives, solvents, dispersing methods and the like used in the magnetic layer shown below can be applied to the lower layer in the present invention. In particular, with respect to the amounts and the kinds of the binder resins, and the addition amounts and the kinds of the additives and the dispersants, well-known techniques regarding the magnetic layer can be applied to the lower layer in the present invention.

Binder:

The binders, lubricants, dispersants, additives, solvents, dispersing methods and the like so far been used in the magnetic layer, nonmagnetic layer and backing layer can be used in the magnetic layer, nonmagnetic layer and backing layer in the present invention. In particular, with respect to the amounts and kinds of binders, and the addition amounts and kinds of additives and dispersants, well-known techniques regarding the magnetic layer can be applied to the present invention.

Conventionally well-known thermoplastic resins, thermosetting resins, reactive resins and mixtures of these resins are used as binders in the present invention. Thermoplastic resins having a glass transition temperature of from −100 to 150° C., a number average molecular weight of from 1,000 to 200,000, preferably from 10,000 to 100,000, and a polymerization degree of from about 50 to about 1,000 can be used in the present invention.

The examples of thermoplastic resins include polymers or copolymers containing, as the constituting unit, the following compounds, e.g., vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal or vinyl ether; polyurethane resins and various rubber resins. The examples of thermosetting resins and reactive resins for use in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. These resins are described in detail in *Plastic Handbook*, published by Asakura Shoten. In addition, when electron beam-curable resins are used in each layer, not only the coated film is strengthened and the durability is improved but also the surface is smoothed and the electromagnetic characteristics are further improved. The examples of these resins and the producing methods are disclosed in detail in JP-A-62-256219. These resins can be used alone or in combination, and the examples of preferred combinations include combinations of at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of any of these resins with polyisocyanate.

Polyurethane resins having well-known structures, e.g., polyester polyurethane, polyether polyurethane, polyether polyester polyurethane, polycarbonate polyurethane, polyester polycarbonate polyurethane and polycaprolactone polyurethane, can be used. Concerning every binder shown above, it is preferred that at least one polar group selected from the following groups be introduced by copolymerization or addition reaction for the purpose of obtaining further excellent dispersibility and durability, e.g., —COOM, —SO$_3$M, —OSO$_3$M, —P=O(OM)$_2$, —O—P=O(OM)$_2$ (wherein M represents a hydrogen atom or an alkali metal salt group), —NR$_2$, —N$^+$R$_2$ (wherein R represents a hydrocarbon group), an epoxy group, —SH and —CN. The amount of these polar groups is from $10^{-1}$ to $10^{-8}$ mol/g, and preferably from $10^{-2}$ to $10^{-6}$ mol/g.

The specific examples of binders which are used in the present invention include VAGH, VYHH, VMCH, VAGF, VAGD, VROH, VYES, VYNC, VM/ML, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR110, MR100, MR555 and 400X-110A (manufactured by Nippon Zeon Co., Ltd.), Nippollan N2301, N2302 and N2304 (manufactured by Nippon Polyurethane Co., Ltd.), Pandex T-5105, T-R3080, T-5201, Burnock D-400, D-210-80, CRISVON 6109 and 7209 (manufactured by Dainippon Ink and Chemicals Inc.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichiseika Color & Chemicals Mfg. Co., Ltd.), MX5004 (manufactured by Mitsubishi Kasei Corp.), Sunprene SP-150 (manufactured by Sanyo Chemical Industries Co. Ltd.), and Salan F310 and F210 (manufactured by Asahi Chemical Industry Co., Ltd.).

The amount of binders for use in the nonmagnetic layer and the magnetic layer of the present invention is from 5 to 50 mass % based on the amount of the nonmagnetic powder or the magnetic powder, and preferably from 10 to 30 mass %. When vinyl chloride resins are used as a binder, the amount is from 5 to 30 mass %, when polyurethane resins are used, the amount is from 2 to 20 mass %, and it is preferred that polyisocyanate is used in an amount of from 2 to 20 mass % in combination with these binders. However, for instance, when head corrosion is caused by a slight amount of chlorine due to dechlorination, it is also possible to use polyurethane alone or a combination of polyurethane and isocyanate alone. When polyurethane is used in the present invention, it is preferred that the polyurethane has a glass transition temperature of from −50 to 150° C., preferably from 0 to 100° C., breaking elongation of from 100 to 2,000%, breaking stress of from 0.05 to 10 kg/mm$^2$ (from 0.49 to 98 MPa), and a yielding point of from 0.05 to 10 kg/mm$^2$ (from 0.49 to 98 MPa).

The magnetic sheet according to the present invention comprise at least two layers. Accordingly, the amount of a binder, the amounts of vinyl chloride resins, polyurethane resins, polyisocyanate or other resins contained in a binder, the molecular weight of each resin constituting a magnetic layer, the amount of polar groups, or the above-described physical properties of resins can of course be varied in a nonmagnetic layer and a magnetic layer, according to necessity. These factors should be rather optimized in each layer, and well-known prior techniques with respect to multilayer magnetic layers can be used in the present invention. For example, when the amount of a binder is varied in each layer, it is effective to increase the amount of a binder contained in a magnetic layer to decrease scratches on the surface of the magnetic layer. For improving head touch against a head, it is effective to increase the amount of a binder in a nonmagnetic layer to impart flexibility.

The examples of polyisocyanates for use in the present invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone, or in combinations of two or more taking the advantage of a difference in curing reactivity in each layer.

Carbon Black, Abrasive:

The examples of carbon blacks which are used in a magnetic layer in the present invention include furnace blacks for rubbers, thermal blacks for rubbers, carbon blacks for coloring and acetylene blacks. They preferably have a specific surface area (SBET) of from 5 to 500 m$^2$/g, a DBP oil absorption amount of from 10 to 400 ml/100 g, a particle size of from 5 to 300 mp, pH of from 2 to 10, a water content of from 0.1 to 10%, and a tap density of from 0.1 to 1 g/ml. The specific examples of carbon blacks for use in the present invention include BLACKPEARLS 2000, 1300, 1000, 900, 905, 800 and 700 and VULCAN XC-72 (manufactured by Cabot Co., Ltd.), #80, #60, #55, #50 and #35 (manufactured by Asahi Carbon Co., Ltd.), #2400B, #2300, #900, #1000, #30, #40 and #10B (manufactured by Mitsubishi Kasei Corp.), CONDUCTEX SC, RAVEN 150, 50, 40 and 15, and RAVEN-MT-P (manufactured by Columbia Carbon Co., Ltd.), and Ketjen Black EC (manufactured by Akzo Co., Ltd.). Carbon blacks for use in the present invention may be surface-treated with a dispersant in advance, may be grafted with a resin, or a part of the surface may be graphitized before use. Carbon blacks may be previously dispersed in a binder before being added to a magnetic coating solution. These carbon blacks may be used alone or in combination. Carbon blacks are preferably used in an amount of from 0.1 to 30% based on the amount of the magnetic powder. Carbon blacks can serve various functions such as preventing the static charge and reducing the friction coefficient of a magnetic layer, imparting a light-shielding property to a magnetic layer, and improving the film strength of a magnetic layer. Such functions vary depending upon the kind of the carbon black to be used. Accordingly, it is of course possible in the invention to select and determine the kinds, amounts and combinations of the carbon blacks to be added to an upper magnetic layer and a lower nonmagnetic layer, on the basis of the above-described various properties such as the particle size, the oil absorption amount, the electric conductivity and the pH value, or these should be rather optimized in each layer. Regarding carbon blacks which can be used in a magnetic layer in the invention, e.g., *Carbon Black Binran* (*Handbook of Carbon Blacks*), edited by the Carbon Black Association, can be referred to.

As abrasives which are used in the present invention, well-known materials essentially having a Mohs' hardness of 6 or more may be used alone or in combination, e.g., alpha-alumina having an alpha-conversion rate of 90% or more, beta-alumina, silicon carbide, chromium oxide, cerium oxide, alpha-iron oxide, corundum, artificial diamond, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be achieved so long as the content of the main component is 90% or more. These abrasives preferably have a particle size of from 0.01 to 2 μm. In particular, for improving electromagnetic characteristics, abrasives having narrow particle size distribution are preferably used. For improving durability, a plurality of abrasives each having a different particle size may be combined according to necessity, or a single abrasive having a broad particle size distribution may be used so as to attain the same effect as such a combination. Abrasives for use in the present invention preferably have a tap density of from 0.3 to 2 g/ml, a water content of from 0.1 to 5%, a pH value of from 2 to 11, and a specific surface area ($S_{BET}$) of from 1 to 30 m$^2$/g. The figure of the abrasives for use in the present invention may be any of acicular, spherical and die-like figures. Abrasives having a figure partly with edges are preferred for their high abrasive property. The specific examples of abrasives for use in the invention include AKP-12, AKP-15, AKP-20, AKP-30, AKP-50, HIT-20, HIT-30, HIT-55, HIT-60, HIT-70, HIT-80 and HIT-100 (manufactured by Sumitomo Chemical Co., Ltd.), ERC-DBM, HP-DBM and HPS-DBM (manufactured by Reynolds International Inc.), WA10000 (manufactured by Fujimi Kenmazai K.K.), UB20 (manufactured by Uemura Kogyo K.K.), G-5, Chromex U2 and Chromex U1 (manufactured by Nippon Chemical Industrial Co., Ltd.), TF100 and TF140 (manufactured by Toda Kogyo Co., Ltd.), beta-Random Ultrafine (manufactured by Ividen Co., Ltd.), B-3 (manufactured by Showa Mining Co., Ltd.), MD-150 (manufactured by Tomei Daiya Co., Ltd.), and LS600F (manufactured by LANDS Co.). These abrasives can also be added to a nonmagnetic layer, if necessary. By adding abrasives into a nonmagnetic layer, it is possible to control the surface configuration or prevent abrasives from protruding. The particle sizes and the amounts of these abrasives to be added to a magnetic layer and a nonmagnetic layer should be selected at optimal values.

Additive:

Additives having a lubricating effect, an antistatic effect, a dispersing effect and a plasticizing effect are used in a magnetic layer and a nonmagnetic layer in the present invention. The examples of the additives which can be used in the present invention include molybdenum disulfide, tungsten disulfide, graphite, boron nitride, graphite fluoride, silicone oil, polar group-containing silicon, fatty acid-modified silicon, fluorine-containing silicon, fluorine-containing alcohol, fluorine-containing ester, polyolefin, polyglycol, alkylphosphoric ester and alkali metal salt thereof, alkylsulfuric ester and alkali metal salt thereof, polyphenyl ether, phenylphosphonic acid, alpha-naphthylphosphoric acid, phenylphosphoric acid, diphenylphosphoric acids, p-ethylbenzenephosphonic acid, phenylphosphinic acid, aminoquinones, various kinds of silane coupling agents, titanium coupling agents, fluorine-containing alkylsulfuric ester and alkali metal salt thereof, monobasic fatty acid having from 10 to 24 carbon atoms (which may contain an unsaturated bond or may be branched) and metal salt thereof (e.g., with Li, Na, K or Cu), mono-, di-, tri-, tetra-, penta- or hexa-alcohol having from 12 to 22 carbon atoms (which may contain an unsaturated bond or may be branched), alkoxy alcohol having from 12 to 22 carbon atoms, mono-fatty acid ester, di-fatty acid ester or tri-fatty acid ester comprising a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid ester of monoalkyl ether of alkylene oxide polymer, fatty acid amide having from 8 to 22 carbon atoms, and aliphatic amine having from 8 to 22 carbon atoms.

The specific examples of fatty acids as additives include capric acid, caprylic acid, lauric acid, myristic acid, palmitic acid, stearic acid, behenic acid, oleic acid, elaidic acid, linolic acid, linolenic acid and isostearic acid. The examples of esters include butylstearate, octylstearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl, and the examples of alcohols include oleyl alcohol, stearyl alcohol and lauryl alcohol. In addition to the above compounds, nonionic surfactants, e.g., alkylene oxide, glycerol, glycidol or alkylphenol-ethylene oxide adducts; cationic surfactants, e.g., cyclic amine, ester amide, quaternary ammonium salts, hydantoin derivatives, heterocyclic compounds, phosphonium and sulfonium; anionic surfactants containing an acid group such as a carboxylic acid, a sulfonic acid, a phosphoric acid, a sulfuric ester group or a phosphoric ester group; and ampholytic surfactants, e.g., amino acids, aminosulfonic acids, sulfuric or phosphoric esters of amino alcohols, and alkylbetain type surfactants can also be used. The details of these surfactants are described in *Kaimen Kasseizai Binran (Handbook of Surfactants)*, Sangyo Tosho Publishing Co., Ltd. These lubricants and antistatic agents need not be 100% pure and they may contain impurities such as isomers, unreacted products, byproducts, decomposed products and oxides, in addition to the main components. However, the content of such impurities is preferably 30% or less, and more preferably 10% or less.

These lubricants and surfactants which are used in the present invention severally have different physical functions. The kinds, amounts, and proportions of combined use of lubricants generating a synergistic effect should be determined optimally in accordance with the purpose. A nonmagnetic layer and a magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of surfactants may be controlled so as to improve the coating stability, or the amounts of lubricants in an intermediate layer may be made larger so as to improve the lubricating effect of the surface thereof. Examples are by no means limited thereto. In general, the total amount of lubricants is from 0.1 to 50% based on the magnetic powder or the nonmagnetic powder, preferably from 2 to 25%.

All or a part of the additives to be used in the present invention may be added to a magnetic coating solution and a nonmagnetic coating solution in any step of preparation. For example, additives may be blended with a magnetic powder before a kneading step, may be added in a step of kneading a magnetic powder, a binder and a solvent, may be added in a dispersing step, may be added after a dispersing step, or may be added just before coating. According to purpose, there is a case of capable of attaining the object by coating all or a part of additives simultaneously with or successively after coating a magnetic layer. According to purpose, lubricants may be coated on the surface of a magnetic layer after calendering treatment or after completion of slitting.

Well-known organic solvents can be used in the present invention, e.g., the organic solvents disclosed in JP-A-6-68453, can be used.

Layer Constitution:

The support thickness of a magnetic sheet in the present invention is from 2 to 150 μm, preferably from 20 to 80 μm. A subbing layer may be provided between a support and a nonmagnetic layer or a magnetic layer for the improvement of adhesion. The thickness of the subbing layer is from 0.01 to 0.5 μm, and preferably from 0.02 to 0.5 μm. The magnetic sheet in the present invention may comprise a nonmagnetic layer and a magnetic layer provided on both surface sides of a support, or a nonmagnetic layer and a magnetic layer may be provided on either one surface side. When a nonmagnetic layer and a magnetic layer are provided on only one surface side of a support, a back coating layer may be provided on the side of a support opposite to the side having a nonmagnetic layer and a magnetic layer for the purpose of static charge prevention and curling correction. The back coating layer thickness is from 0.1 to 4 μm, and preferably from 0.3 to 2.0 μm. Well-known subbing layers and back coating layers can be used for this purpose.

The thickness of a magnetic layer is 200 nm or less, and preferably from 30 to 150 nm. The variation coefficient of the thickness of a magnetic layer is preferably within plus or minus 20%, and more preferably within plus or minus 5%.

A magnetic layer may comprise two or more layers having different magnetic characteristics, and well-known multi-layer constitutions of magnetic layers can be applied to the present invention.

The thickness of a nonmagnetic layer which is the lower layer of the magnetic recording medium of the invention is generally from 0.2 to 5.0 μm, preferably from 0.3 to 3.0 μm, and more preferably from 1.0 to 2.5 μm. The lower layer exhibits the effect of the invention so long as it is substantially a nonmagnetic layer even if, or intentionally, it contains a small amount of magnetic powder as an impurity, which is as a matter of course regarded as essentially the same constitution as in the present invention. The term "substantially nonmagnetic" means that the residual magnetic flux density of the lower layer is 50 mT or less or the coercive force is 500 Oe (40 kA/m) or less, and preferably the residual magnetic flux density and the coercive force are zero.

Support:

Well-known films, such as polyesters (e.g., polyethylene terephthalate and polyethylene naphthalate), polyolefins, cellulose triacetate, polycarbonate, polyamide, polyimide, polyamideimide, polysulfone, polyaramid, aromatic polyamide, and polybenzoxazole. Highly strong supports such as polyethylene naphthalate and polyamide are preferably used. If necessary, a lamination type support as disclosed in JP-A-3-224127 can also be used to vary the surface roughnesses of a magnetic surface and a base surface. These supports may be subjected to surface treatments in advance, such as corona discharge treatment, plasma treatment, adhesion assisting treatment, heat treatment, and dust removing treatment. It is also possible to use an aluminum or glass substrate as a support in the present invention.

For attaining the object of the present invention, it is preferred to use a support having a central plane average surface roughness (SRa) of 8.0 nm or less measured by TOPO-3D (by WYKO Co.), preferably 4.0 nm or less, and more preferably 0.2 nm or less. It is preferred that a support not only has a small central plane average surface roughness but also is free from coarse projections having a height of 0.5 µm or higher. Surface roughness configuration is freely controlled by the size and the amount of fillers added to a support. The examples of such fillers include acryl-based organic fine powders, in addition to oxides and carbonates of Ca, Si and Ti. A support for use in the present invention preferably has a maximum height (SRmax) of 1 µm or less, ten point average roughness (SRz) of 0.5 µm or less, central plane peak height (SRp) of 0.5 µm or less, central plane valley depth (SRv) of 0.5 µm or less, central plane area factor (SSr) of from 10 to 90%, and average wavelength (S$\lambda$a) of from 5 to 300 µm. For obtaining desired electromagnetic characteristics and durability, the projection distribution on the surface of a support can be controlled arbitrarily by fillers, e.g., the number of projections having sizes of from 0.01 to 1 µm can be controlled each within the number of from 0 to 2,000 per 0.1 mm$^2$.

A support for use in the invention has an F-5 value of preferably from 5 to 50 kg/mm$^2$ (from 49 to 490 MPa), a thermal shrinkage factor of a support at 100° C. for 30 minutes of preferably 3% or less, more preferably 1.5% or less, and a thermal shrinkage factor at 80° C. for 30 minutes of preferably 0.5% or less, more preferably 0.1% or less. A support has a breaking strength of from 5 to 100 kg/mm$^2$ (from 49 to 980 MPa), an elastic modulus of from 100 to 2,000 kg/mm$^2$ (from 0.98 to 19.6 GPa), a temperature expansion coefficient of from $10^{-4}$ to $10^{-8}$/° C., preferably from $10^{-5}$ to $10^{-6}$/° C., and a humidity expansion coefficient of $10^{-4}$/RH % or less, preferably $10^{-5}$/RH % or less. These thermal characteristics, dimensional characteristics and mechanical strength characteristics are preferably almost equal in every direction of in-plane of a support with the difference of 10% or less.

Manufacturing Method:

Processes of preparing a magnetic layer coating solution for use in the magnetic sheet of the present invention comprise at least a kneading step, a dispersing step and blending steps to be carried out optionally before and/or after the kneading and dispersing steps. Each of these steps may be composed of two or more separate stages. Materials such as magnetic powder, nonmagnetic powder, a binder, a carbon black, an abrasive, an antistatic agent, a lubricant and a solvent for use in the present invention may be added in any step at any time, and each material may be added in two or more steps separately. For instance, polyurethane can be added in parts in a kneading step, a dispersing step, or a blending step for adjusting viscosity after dispersion. For achieving the object of the present invention, the above steps can be performed partly with conventionally well-known producing techniques. It is preferred to use powerful kneading machines such as an open kneader, a continuous kneader, a pressure kneader or an extruder in a kneading step. When a kneader is used, magnetic powder or nonmagnetic powder and all or a part of a binder (preferably 30% or more of the total binders) in the range of from 15 to 500 parts per 100 parts of the magnetic powder are kneading-treated. Details of kneading treatment are disclosed in JP-A-1-106338 and JP-A-1-79274. When a magnetic layer coating solution and a nonmagnetic layer coating solution are dispersed, glass beads can be used, but dispersing media having a high specific gravity, e.g., zirconia beads, titania beads and steel beads, are preferably used. Optimal particle size and packing density of these dispersing media should be selected. Well-known dispersing apparatus can be used in the invention.

The following methods are preferably used for coating a magnetic sheet having a multilayer constitution in the present invention. As the first method, a lower layer is coated by any of gravure coating, roll coating, blade coating and extrusion coating apparatus in the first place, which are generally used in the coating of a magnetic coating solution, and then an upper layer is coated while the lower layer is still wet by means of a support pressing type extrusion coating apparatus as disclosed in JP-B-1-46186 (the term "JP-B" as used herein means an "examined Japanese patent publication"), JP-A-60-238179 and JP-A-2-265672. As the second method, an upper layer and a lower layer are coated almost simultaneously using a coating head equipped with two slits for feeding coating solution as disclosed in JP-A-63-88080, JP-A-2-17971 and JP-A-2-265672. As the third method, an upper layer and a lower layer are coated almost simultaneously using an extrusion coating apparatus equipped with a backup roll as disclosed in JP-A-2-174965. For preventing the electromagnetic characteristics of a magnetic disc medium from lowering due to agglomeration of magnetic particles, it is preferred to give shear to the coating solution in a coating head by the methods as disclosed in JP-A-62-95174 and JP-A-1-236968. With respect to the viscosity of a coating solution, it is necessary to satisfy the range of the numeric values disclosed in JP-A-3-8471. For realizing the constitution of the present invention, a successive multilayer coating method of coating a lower layer, drying the lower layer and then coating a magnetic layer on the lower layer can be used.

In the case of manufacturing a magnetic disc, isotropic orientation can be sufficiently achieved in some cases without performing orientation using an orientation apparatus, but it is preferred to use well-known random orientation apparatuses, e.g., disposing cobalt magnets diagonally and alternately or applying an alternating current magnetic field using a solenoid. Hexagonal ferrites in general have an inclination for three dimensional random orientation of in-plane and in the perpendicular direction but they can be made in-plane two dimensional random orientation. Circumferential orientation can be performed using spin coating.

It is preferred that the drying position of a coated film can be controlled by controlling the temperature and the amount of drying air and a coating velocity. A coating velocity is preferably from 20 to 1,000 m/min. and the temperature of drying air is preferably 60° C. or higher. It is also possible to carry out appropriate preliminary drying before a coated film enters a magnet zone.

Heat resisting plastic rollers such as epoxy, polyimide, polyamide and polyimideamide rollers, or metal rollers are used for calendering treatment. Metal rollers are preferably used for the treatment particularly when magnetic layers are coated on both surfaces of a support. Treatment temperature is preferably 50° C. or more, and more preferably 100° C. or more. Linear pressure is preferably 200 kg/cm (196 kN/m) or more, and more preferably 300 kg/cm (294 kN/m) or more.

Surface treatment with an abrasive tape comprising alumina, chromium oxide or diamond is preferred to remove protrusion and impurities.

Physical Properties:

The saturation magnetic flux density of a magnetic layer of the magnetic sheet according to the invention is from 100 to 300 mT. Hr is from 1,800 to 5,000 Oe (from 144 to 400 kA/m), and preferably from 2,000 to 3,500 Oe (from 160 to 280 kA/m). Coercive force distribution is preferably narrow, and SFD and SFDr are preferably 0.6 or less, and more preferably 0.2 or less.

The squareness ratio of a magnetic disc medium is preferably from 0.45 to 0.65 in the case of random orientation, and the squareness ratio is preferably isotropic in a disc. SQ is preferably 0.6 or higher in the circumferential direction similarly to a tape medium when circumferential orientation is performed.

The magnetic sheet in the invention has a friction coefficient against head of 0.5 or less at temperature of from −10° C. to 40° C. and humidity of from 0% to 95%, preferably 0.3 or less, a surface inherent resistivity of a magnetic layer surface of preferably from $10^4$ to $10^{12}$ ohm/sq, a charge potential of preferably from −500 V to +500 V, an elastic modulus at 0.5% elongation of a magnetic layer of preferably from 100 to 2,000 kg/mm$^2$ (from 980 to 19,600 N/mm$^2$) in every direction of in-plane, a breaking strength of preferably from 10 to 70 kg/cm$^2$ (from 98 to 686 N/mm$^2$), an elastic modulus of preferably from 100 to 1,500 kg/mm$^2$ (from 980 to 14,700 N/mm$^2$) in every direction of in-plane, a residual elongation of preferably 0.5% or less, and a thermal shrinkage factor at every temperature of 100° C. or less of preferably 1% or less, more preferably 0.5% or less, and most preferably 0.1% or less. The glass transition temperature of a magnetic layer (the maximum of loss elastic modulus of dynamic visco-elasticity measurement measured at 110 Hz) is preferably from 50° C. to 120° C., and that of a lower layer is preferably from 0° C. to 100° C. The loss elastic modulus of a magnetic layer is preferably within the range of from $1 \times 10^3$ to $8 \times 10^4$ N/cm$^2$, and the loss tangent is preferably 0.2 or less. When the loss tangent is too great, adhesion failure is liable to occur. These thermal and mechanical characteristics are preferably almost equal in every direction of in-plane of a medium within difference of 10% or less. The residual amount of solvent in a magnetic layer is preferably 100 mg/m$^2$ or less, and more preferably 10 mg/m$^2$ or less. The void ratio of a coating layer is preferably 30% by volume or less, and more preferably 20% by volume or less, with both of a lower layer and an upper layer. The void ratio is preferably smaller for obtaining higher output, but a specific value should be preferably secured depending upon purposes in some cases. For example, in a disc medium which is repeatedly used, large void ratio contributes to good running durability in many cases.

The central plane average surface roughness (Ra) of a magnetic layer surface measured by TOPO-3D (WYKO Co.) is from 1 to 4 nm, preferably from 1 to 3 nm, and more preferably from 1 to 2 nm. When Ra is higher than 4 nm, not only the output lowers due to space loss but liner flocks generate and dropout increases, while when Ra is less than 1 nm, a magnetic layer is easily scraped off by means of a liner.

The number of projections on a magnetic layer surface of the recording medium of the present invention having an area of 30 µm square and a height of 20 nm or more measured by AFM is preferably 100 or less. When the number of projections exceeds 100, scraping off of the projections on a magnetic layer surface prevails and dropout is liable to increase.

A magnetic layer for use in the present invention preferably has a maximum height (SRmax) of 0.5 µm or less, a ten point average roughness (SRz) of 0.3 µm or less, a central plane peak height (SRp) of 0.3 µm or less, a central plane valley depth (SRv) of 0.3 µm or less, a central plane area factor (SSr) of from 20 to 80%, and an average wavelength (Sλa) of from 5 to 300 µm. Surface projections of a magnetic layer having sizes of from 0.01 to 1 µm can be arbitrarily set in the range of the number of from 0 to 2,000 per 0.1 mm$^2$, and it is preferred to optimize electromagnetic characteristics and friction coefficient by setting the projection distribution on the surface of a magnetic layer. These characteristics can be easily controlled by controlling the surface property of a magnetic layer by fillers in a support, controlling the particle size and the amount of the magnetic powder added to a magnetic layer, or varying the surface configuration of the rollers used in calendering treatment. Curling is preferably within the range of plus or minus 3 mm.

It can be easily presumed that these physical properties can be varied according to purposes in a nonmagnetic layer and a magnetic layer of the magnetic sheet of the present invention. For example, the elastic modulus of a magnetic layer is made higher to improve running durability and at the same time the elastic modulus of a nonmagnetic layer is made lower than that of a magnetic layer, to thereby improve the head touching of the magnetic sheet.

Use Method:

The magnetic disc medium according to the present invention can be used on the following conditions. The outside and inside diameters of a magnetic sheet are not especially restricted but, for maintaining a stable rotation state, the outside diameter is preferably from 1 to 15 cm, and preferably from 2 to 10 cm. The inside diameter is decided by a chucking system and a disc recording area, and it is generally from 2 to 40 mm.

The engine speed of a disc is preferably from 200 to 2,000 rpm, and more preferably from 1,000 to 10,000 rpm.

When the engine speed is too high, the stable rotation of a disc cannot be maintained sometimes, and when the engine speed is too low, the data transfer speed slows down.

MR heads, e.g., AMR, GMR and TMR, which are capable of obtaining excellent electromagnetic characteristics of discs, are preferably used as the heads for recording and reproduction.

In the specification of the present invention, 1 Oe (Oersted) was converted to 0.08 kA/m, and 1 kgf was converted to 9.8 N.

EXAMPLES

The present invention will be illustrated in detail with reference to examples below, but these are not to be construed as limiting the invention.

Examples 1 to 9 and Comparative Examples 1 to 11

Preparation of Coating Solution:

| Magnetic coating solution A: | |
|---|---|
| Barium ferrite magnetic powder | 100 parts |
| Composition in molar ratio based on Ba: | |
| Fe, 9.10, Co, 0.22, Zn, 0.71 | |
| Hc: 2,400 Oe (192 kA/m) | |
| $S_{BET}$: 70 m$^2$/g | |
| $\sigma_s$: 52 A·m$^2$/kg | |
| Average tabular diameter: 22 nm | |
| Average tabular ratio: 3.0 | |
| Polyurethane resin: | |
| UR 8200 (manufactured by Toyobo Co., Ltd.) | 8 parts |
| UR 8300 (manufactured by Toyobo Co., Ltd.) | 4 parts |
| alpha-Alumina: | |
| HIT55 (manufactured by Sumitomo Chemical Co., Ltd.) | 4 parts |
| Diamond: | |
| MD 150 (manufactured by Tomei Daiya K.K.) | 1 part |
| Carbon black: | |
| #50 (manufactured by Asahi Carbon Co., Ltd.) | 1 part |
| Phenylphosphonic acid | 1 part |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Magnetic coating solution B: | |
| Ferromagnetic metal fine powder | 100 parts |
| Composition: Fe 70%, Co 30% | |
| Hc: 2,400 Oe (192 kA/m) | |
| $S_{BET}$: 70 m$^2$/g | |
| $\sigma_s$: 112 A·m$^2$/kg | |
| Crystallite size: 118 angstroms | |
| Average long axis length: 55 nm | |
| Average acicular ratio: 4 | |
| Sintering inhibitor: | |
| Al compound (Al/Fe, atomic ratio: 8%) | |
| Y compound (Y/Fe, atomic ratio: 8%) | |
| UR 8200 (manufactured by Toyobo Co., Ltd.) | 15 parts |
| MD 80 (manufactured by Tomei Daiya K.K.) | 2 parts |
| HIT60 (manufactured by Sumitomo Chemical Co., Ltd.) | 5 parts |
| #50 (manufactured by Asahi Carbon Co., Ltd.) | 5 parts |
| Butyl stearate | 2 parts |
| Butoxyethyl stearate | 2 parts |
| Isohexadecyl stearate | 4 parts |
| Stearic acid | 2 parts |
| Methyl ethyl ketone | 180 parts |
| Cyclohexanone | 180 parts |
| Nonmagnetic coating solution: | |
| Nonmagnetic powder, α-Fe$_2$O$_3$, hematite | 80 parts |
| Average long axis length: 0.08 μm | |
| $S_{BET}$: 80 m$^2$/g | |
| pH: 9 | |
| Surface-covering layer: Al$_2$O$_3$ existed on the surface of the nonmagnetic powder at 8 mass % of all the particles | |
| Carbon black | |
| CONDUCTEX SC-U (manufactured by Columbia Carbon Co., Ltd.) | 15 parts |
| Polyurethane resin | |
| UR 8200 (manufactured by Toyobo Co., Ltd.) | 12 parts |
| UR 8300 (manufactured by Toyobo Co., Ltd.) | 6 parts |
| Phenylphosphonic acid | 3 parts |
| Butyl stearate | 8 parts |
| Butoxyethyl stearate | 5 parts |
| Isohexadecyl stearate | 2 parts |
| Stearic acid | 3 parts |
| Methyl ethyl ketone/cyclohexanone (8/2 mixed solvent) | 250 parts |

Manufacture of Magnetic Disc Medium:

The components of each coating solution were kneaded by a kneader and dispersed in a sand mill. Polyisocyanate was added to each resulting dispersion solution, that is, 10 parts to the coating solution for forming a nonmagnetic layer, and 10 parts to the coating solution for forming a magnetic layer. Further, 40 parts of cyclohexanone was added to each solution, and each solution was filtered through a filter having an average pore diameter of 1 μm, thereby coating solutions for forming a nonmagnetic layer and a magnetic layer were obtained.

The obtained nonmagnetic layer coating solution was coated on a polyethylene naphthalate support having a thickness of 62 μm and a central plane average surface roughness of 1.8 nm in a dry coating thickness of 1.5 μm, and once dried. Immediately after that, the magnetic layer coating solution was coated thereon by blade coating so as to obtain a magnetic layer having a prescribed thickness. The coated layer was subjected to random orientation treatment by passing through an alternating current magnetic field generator having two magnetic field intensities of frequency of 50 Hz, magnetic field intensity of 25 mT and frequency of 50 Hz, magnetic field intensity of 12 mT. After drying, the layer was subjected to calendering treatment with calenders of 7 stages at 90° C. at linear pressure of 300 kg/cm (294 kN/m). The obtained web was punched to a disc of 3.7 inches, and underwent a surface treatment with abrasives.

After being punched to a disc, the magnetic sheet was subjected to thermo-treatment at 70° C. to expedite the curing treatment of the magnetic layer, and then to burnishing treatment with an abrasive tape. The central plane surface roughness of the magnetic sheet coated with magnetic coating solution A was 2.2 nm, and that of the magnetic sheet coated with magnetic coating solution B was 2.5 nm.

Each of the thus-obtained magnetic sheet was built into a cartridge with a liner having a thickness of 200 μm comprising various compositions as shown in Table 1 below. These liners were fastened on the upper and lower shells constituting the cartridge by ultrasonic welding. The liners were fastened entirely on the shells.

The space between the upper and lower shells was 1.5 mm, and the magnetic disc sheet was made so as to rotate at the central position.

With respect to magnetic coating solution A, dispersion time by the sand mill was varied to thereby prepare samples each having the central plane surface roughness of the magnetic sheet of 0.8 nm, 1.0 nm, 4.0 nm and 6.0 nm (Comparative Example 5, Examples 8 and 9, and Comparative Example 6, respectively).

Method of Evaluations:

(1) Circumferential Scratches

Each magnetic disc obtained was run at rotation of about 3,000 rpm for 480 hours under the atmosphere of 23° C. 50% RH by using a Zip drive in the state of not loading a head. After running, the cartridge was opened and the scratches generated on the magnetic sheet in the circumferential direction were observed. Evaluation was performed according to the following criteria.

x: Visually observable scratches generated.
Δ: Scratches which could be seen with a microscope of 50 magnifications generated.
○: No scratches generated.

(2) Liner Flocks

Each magnetic disc obtained was run at rotation of about 3,000 rpm for 480 hours under the atmosphere of 23° C. 50% RH by using a Zip drive in the state of not loading a head. After running, the cartridge was opened and the fibrous dusts dotted on the magnetic sheet were visually observed. It was confirmed by analysis that liner flocks accounted for nearly all of these fibrous dusts. Evaluation was performed according to the following criteria.

x: Liner flocks generated seriously.
Δ: Liner flocks generated a little.

(5) Number of AFM Projections

The number of projections having a height of 20 nm or higher was counted for an area of 30 μm square by means of AFM.

The results obtained are shown in Table 1 below.

TABLE 1

| Sample | Magnetic Coating Solution | Number of Projections by AFM | Ra of Magnetic Layer (nm) | Liner Composition (%) | | | Circumferential Scratch | Liner Flocks | Increase of Dropout (%) | SN Ratio (dB) |
|---|---|---|---|---|---|---|---|---|---|---|
| | | | | PET | Rayon | Nylon | | | | |
| Example 1 | A | 10 | 2.2 | 100 | | | Δ | ○ | 20 | 25 |
| Example 2 | A | 10 | 2.2 | 80 | 20 | | ○ | ○ | 5 | 25 |
| Example 3 | A | 10 | 2.2 | 50 | 50 | | ○ | ○ | 10 | 25 |
| Example 4 | A | 10 | 2.2 | 20 | 80 | | ○ | Δ | 20 | 25 |
| Comparative Example 1 | A | 10 | 2.2 | 10 | 90 | | ○ | x | 60 | 25 |
| Example 5 | A | 10 | 2.2 | 80 | | 20 | ○ | ○ | 10 | 25 |
| Example 6 | A | 10 | 2.2 | 50 | | 50 | ○ | ○ | 10 | 25 |
| Example 7 | A | 10 | 2.2 | 20 | | 80 | ○ | ○ | 20 | 25 |
| Comparative Example 2 | A | 10 | 2.2 | | 100 | | ○ | x | 200 | 25 |
| Comparative Example 3 | A | 10 | 2.2 | | 80 | 20 | ○ | x | 350 | 25 |
| Comparative Example 4 | A | 10 | 2.2 | | 50 | 50 | ○ | x | 400 | 25 |
| Comparative Example 5 | A | 4 | 0.8 | 80 | 20 | | x | ○ | 50 | 28 |
| Example 8 | A | 6 | 1.0 | 80 | 20 | | Δ | ○ | 10 | 28 |
| Example 9 | A | 30 | 4.0 | 80 | 20 | | ○ | ○ | 15 | 24 |
| Comparative Example 6 | A | 120 | 6.0 | 80 | 20 | | ○ | x | 150 | 22 |
| Comparative Example 7 | B | 20 | 2.5 | 80 | 20 | | x | ○ | 500 | 18 |
| Comparative Example 8 | B | 20 | 2.5 | 20 | 80 | | x | ○ | 300 | 18 |
| Comparative Example 9 | B | 20 | 2.5 | 80 | | 20 | x | ○ | 500 | 18 |
| Comparative Example 10 | B | 20 | 2.5 | 20 | | 80 | x | ○ | 400 | 18 |
| Comparative Example 11 | B | 20 | 2.5 | | 50 | 50 | ○ | Δ | 50 | 18 |

○: Liner flocks hardly generated.

(3) Increase of Dropout

Each magnetic disc was set on a spin stand fitted with a head. Signals of 130 kfci were recorded on a track having a track width of 1.5 μm, the recorded signals were reproduced by an MR head, and the number of record bit which showed reproduction output of 70% or less was counted as dropout (initial dropout). Measurement was performed at three spots of the outside, middle and inside circles of the disc each by 100 tracks. After that, each magnetic disc was run at rotation of about 3,000 rpm for 480 hours under the atmosphere of 23° C. 50% RH by using a Zip drive in the state of not loading a head.

The magnetic disc was set again on the spin stand, and the number of dropout was counted in the same manner, and the increased number over the initial dropout was computed in percent.

(4) SN Ratio

The above magnetic disc was set on the spin stand fitted with a head. Signals of 20 MHz and 130 kfci were recorded with an inductive head, the recorded signals were reproduced by an MR head and the output of the signals were measured. Further, the noises in the range of from 0 to 40 MHz were integrated, and the ratio of the signal to the noise was taken as the SN ratio.

It can be seen from the results in Table 1 that magnetic disc media which satisfy the requirements of the present invention are high in SN ratio, hardly generate magnetic sheet scratches, liner flocks and dropout, and they are excellent in reliability.

Since liner comprising specific composition is used in the present invention, a magnetic sheet excellent in surface smoothness can be formed by using hexagonal ferrite fine powder, so that the present invention can provide a high capacity and highly reliable magnetic disc medium capable of reproduction with an MR head.

This application is based on Japanese Patent application JP 2002-330989, filed Nov. 14, 2002, the entire content of which is hereby incorporated by reference, the same as if set forth at length.

What is claimed is:

1. A magnetic disc medium comprising:
   a magnetic sheet in the form of a disk;
   a case encasing the magnetic sheet so as to be capable of rotating; and
   a nonwoven liner fastened on an inner face of the case so as to face the magnetic sheet,
   wherein the magnetic sheet comprises a support, a substantially nonmagnetic lower layer, and a magnetic layer containing hexagonal ferrite powder dispersed in a binder and having central plane average surface roughness of from 1 nm to 4 nm, and the liner comprises polyethylene terephthalate in an amount of 20% by weight or more.

2. The magnetic disc medium according to claim 1, wherein the liner comprises polyethylene terephthalate in an amount of 50% by weight.

3. The magnetic disc medium according to claim 1, wherein the magnetic layer has central plane average surface roughness of from 1 nm to 3 nm.

4. The magnetic disc medium according to claim 1, wherein the magnetic layer has central plane average surface roughness of from 1 nm to 2 nm.

5. The magnetic disc medium according to claim 1, wherein a surface of the magnetic layer has 100 or less of projections having a height of 20 nm or more measured by AFM at an area of 30 μm square.

6. The magnetic disc medium according to claim 1, wherein the lower layer comprises a carbon black.

7. The magnetic disc medium according to claim 6, wherein the carbon black has a particle size of from 5 to 80 nm.

8. The magnetic disc medium according to claim 6, wherein the carbon black has a particle size of from 10 to 50 nm.

9. The magnetic disc medium according to claim 6, wherein the carbon black has a particle size of from 10 to 40 nm.

10. The magnetic disc medium according to claim 1, wherein the magnetic layer comprises a carbon black.

11. The magnetic disc medium according to claim 10, wherein the carbon black has a particle size of from 5 to 300 mμ.

12. The magnetic disc medium according to claim 1, wherein the lower layer comprises a metallic oxide, a metallic carbonate, a metallic sulfate, a metallic nitride, a metallic carbide or a metallic sulfide.

13. The magnetic disc medium according to claim 1, wherein the lower layer comprises a titanium dioxide, a zinc oxide, an iron oxide or a barium sulfate.

14. The magnetic disc medium according to claim 1, wherein the lower layer comprises a titanium dioxide or an alpha-iron oxide.

* * * * *